US012682768B2

(12) United States Patent    (10) Patent No.:   US 12,682,768 B2

Da Conceicao et al.    (45) Date of Patent:    Jul. 14, 2026

(54) ELECTRONIC DEVICE FOR GENERATING A FLIGHT PLAN FOR AN AIRCRAFT, ASSOCIATED GENERATING METHOD AND COMPUTER PROGRAM PRODUCT

(71) Applicant: THALES, Courbevoie (FR)

(72) Inventors: Marc Da Conceicao, Toulouse (FR); Laurent Castet, Toulouse (FR); Renaud Erba, Toulouse (FR)

(73) Assignee: THALES, Courbevoie (FR)

( * ) Notice: Subject to any disclaimer, the term of this patent is extended or adjusted under 35 U.S.C. 154(b) by 150 days.

(21) Appl. No.: 17/789,035

(22) PCT Filed: Dec. 22, 2020

(86) PCT No.: PCT/EP2020/087708
§ 371 (c)(1),
(2) Date: Jun. 24, 2022

(87) PCT Pub. No.: WO2021/130274
PCT Pub. Date: Jul. 1, 2021

(65) Prior Publication Data
US 2023/0020733 A1    Jan. 19, 2023

(30) Foreign Application Priority Data
Dec. 27, 2019   (FR) ..................................... 19 15663

(51) Int. Cl.
*G08G 5/34*    (2025.01)
*G06F 3/0488*    (2022.01)
(Continued)

(52) U.S. Cl.
CPC ............. *G08G 5/34* (2025.01); *G06F 3/0488* (2013.01); *G06F 3/167* (2013.01); *G08G 5/21* (2025.01);
(Continued)

(58) Field of Classification Search
None
See application file for complete search history.

(56) References Cited

U.S. PATENT DOCUMENTS 6,522,958 B1 *   2/2003   Dwyer ................... G01C 23/00
                                             701/3
6,922,631 B1    7/2005   Dwyer et al.
(Continued)

FOREIGN PATENT DOCUMENTS

CN      106952504 A    7/2017
FR      2941794 A1    8/2010
WO    WO 02/29363 A2    4/2002

OTHER PUBLICATIONS

French Search Report issued by the French Patent Office in corresponding French Application No. 19 15663, mailed Oct. 8, 2020.
(Continued)

*Primary Examiner* — Hongye Liang
(74) *Attorney, Agent, or Firm* — ArentFox Schiff LLP

(57) ABSTRACT

An electronic device configured to generate a flight plan for an aircraft. The device may include a display module configured for displaying two flight plans simultaneously and for each flight plan. The display may be configured for viewing, the common elements and distinct elements with regard to the other flight plan. Further, the device may include an acquisition module configured for acquiring a copy command. Additionally, the device may include a copying module configured for copying at least one of the distinct elements from one of the two flight plans to the other flight plan based on the copy command. Moreover, the device may include a processing module configured for generating a new flight plan based on the target flight plan and the distinct element or elements which were copied.

10 Claims, 4 Drawing Sheets

(51) Int. Cl.

| | |
|---|---|
| *G06F 3/16* | (2006.01) |
| *G08G 5/21* | (2025.01) |
| *G08G 5/26* | (2025.01) |
| *G08G 5/55* | (2025.01) |
| *G08G 5/59* | (2025.01) |

(52) U.S. Cl.
CPC ................. *G08G 5/26* (2025.01); *G08G 5/55* (2025.01); *G08G 5/59* (2025.01)

(56) References Cited

U.S. PATENT DOCUMENTS

| | | | |
|---|---|---|---|
| 8,694,184 B1 | 4/2014 | Boorman et al. | |
| 9,032,319 B1 * | 5/2015 | Hammack ............ | G08G 5/0039 |
| | | | 715/769 |
| 2010/0030401 A1 | 2/2010 | Rogers et al. | |
| 2010/0250026 A1 | 9/2010 | Deker et al. | |
| 2018/0257770 A1 * | 9/2018 | Kubik ................... | B64D 31/06 |
| 2021/0090445 A1 * | 3/2021 | Molnar ................ | G08G 5/0039 |

OTHER PUBLICATIONS

International Search Report issued by the International Searching Authority in corresponding International Application No. PCT/EP2020/087708, mailed Mar. 15, 2021.

* cited by examiner

<u>FIG.1</u>

ELECTRONIC DEVICE FOR GENERATING A FLIGHT PLAN FOR AN AIRCRAFT, ASSOCIATED GENERATING METHOD AND COMPUTER PROGRAM PRODUCT

CROSS-REFERENCE TO RELATED APPLICATIONS

The present Application for Patent is a National Stage Entry of International Application No. PCT/EP2020/087708, filed Dec. 22, 2020, which claims priority to French Patent Application No. 19 15663, filed Dec. 27, 2019. The disclosure of the priority documents are incorporated in their entirety by reference therein.

BACKGROUND OF THE INVENTION

The present invention relates to an electronic device for generating a flight plan for an aircraft.

The present invention further relates to an associated method for generating a flight plan and a computer program product.

The field of the invention is that of the flight management of an aircraft.

As known per se, aircrafts comprise navigation management systems such as e. g. the Flight Management System (FMS) for defining a flight plan and for calculating a trajectory and predictions associated with said trajectory.

The flight plan is generally defined by a pilot before the flight.

However, in some cases, the flight plan may be subject to modifications during e. g. the flight of the aircraft.

In such cases, specialized applications of the FMS system allow a third-party system to submit a new flight plan to be followed by the aircraft.

Such a third-party system may be another on-board avionics system or a tablet which can be used by the pilot in the cockpit, as well as a system external to the aircraft such as e. g. a ground service or another aircraft.

Under the current state of the aeronautical procedure, the pilot has the obligation to perform a full analysis of the proposed flight plan proposed during the flight from a third-party system, and to decide whether or not to accept the plan.

The methods known from the prior-art propose an "all or nothing" approach insofar as the proposed flight plan is either fully accepted or fully rejected by the pilot.

Currently, the pilot is responsible for a manual check of the conformity and consistency of the proposed flight plan.

Most of the time, such control is tedious. Indeed, there is generally no technique allowing the pilot to make sure that a received flight plan is acceptable, nor to understand the nature of the modifications compared to the flight plan originally planned thereof.

SUMMARY OF THE INVENTION

The purpose of the present invention is to simplify the tasks of the pilot when receiving a new flight plan, in particular, from a third-party system.

To this end, the subject matter of the present invention is an electronic device for generating a flight plan for an aircraft, the generating device comprising a display module configured for displaying two flight plans simultaneously, each flight plan being associated with an ordered list of elements, the display module being further configured for viewing, for each flight plan, the elements which are common and the elements which are distinct from the other flight plan; an acquisition module configured for acquiring at least one copy command from a user; a copying module configured for copying at least one of the distinct elements from one of the two flight plans known as the source flight plan to the other flight plan known as the target flight plan according to the copy command; and a processing module configured for generating a new flight plan based on the target flight plan and the distinct elements(s) which were copied.

According to other advantageous aspects of the invention, the generating device comprises one or more of the following characteristics, taken individually or according to all technically possible combinations:

the generating device further comprises a communications module configured for sending the new flight plan to a control center external to the aircraft;

each flight plan is broken down into a plurality of predetermined flight phases, each flight phase comprising at least one of the elements associated with said flight plan, the copying module being configured for copying at least one of the phases comprising at least one of the distinct elements of said flight plan.

each flight plan is broken down into a plurality of predetermined control zones, each control zone being associated with a flight control center external to the aircraft, each control zone comprising at least one of the elements associated with said flight plan, the copying module being configured for copying at least one of the control zones comprising at least one of the distinct elements of said flight plan.

the acquisition module is further configured for receiving a cancellation command, and the copying module being configured for canceling the copy, either permanently or temporarily, depending on the cancellation command.

the generating device further comprises a touch screen, the acquisition module being configured for associating a touch movement of a user on the touch screen with an associated command;

the generating device further comprises a voice-user interface, the acquisition module being configured for associating a voice message from a user towards the voice-user interface with an associated command.

the display module is apt to display the common elements and the separate elements differently; and the display module is configured for displaying flight plans in a tree structure that defines a plurality of levels, each level comprising one root formed by one of the common elements or a branch of each flight plan, at least one of the branches amongst the branches of a same level, comprising at least one of the distinctive elements associated with the corresponding flight plan.

The further subject matter of the invention is a method for generating a flight plan for an aircraft, the generating process comprising at least the following steps:

simultaneous displaying two flight plans, each flight plan being associated with an ordered list of elements;

displaying the common elements and the distinct elements between the two flight plans;

acquiring at least one copy command from a user;

copying at least one of the distinct elements from one of the two flight plans known as the source flight plan to the other flight plan known as the target flight plan according to the copy command; and generating a new flight plan from the target flight plan and the distinct copied element(s).

The further subject matter of the invention is a computer program product including software instructions which, when executed by a computer, implement a generating method as defined above.

BRIEF DESCRIPTION OF THE DRAWINGS

The characteristics and advantages of the invention will appear upon reading the following description, given only as a limiting example, and making reference to the enclosed drawings, wherein.

DETAILED DESCRIPTION OF PREFERRED EMBODIMENTS

Figure 1:
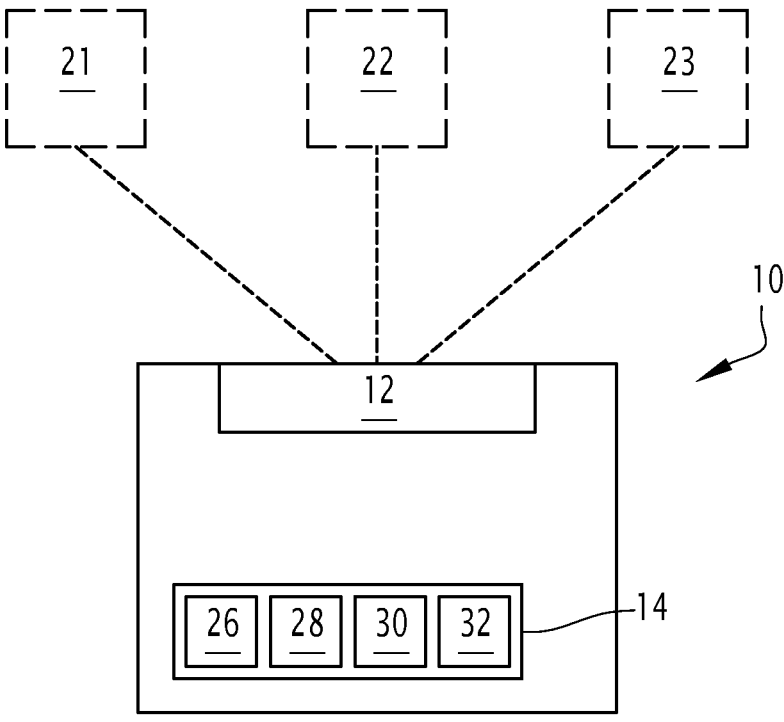
FIG. 1 is an organizational chart of an electronic generating device according to the invention.

A generating device 10 of at least one flight plan for an aircraft is shown in FIG. 1.

"Aircraft" refers to any flying machine which can be remotely piloted from a cockpit thereof, such as an airplane, or which can be also remotely piloted by a pilot who is then at a distance from the flying machine, such as a drone.

A "flight plan" refers to an ordered list of elements and descriptive data corresponding to said elements, allowing at least part of the aircraft trajectory to be defined.

Such elements and descriptive data will subsequently be referred to as interior elements and interior descriptive data respectively, in order to underline their belonging thereof to the corresponding flight plan.

The flight plan is formed e. g. according to the ARINC 424 standard.

Thus, in accordance with this standard, each interior element of the flight plan comprises a physical point of passage of the aircraft called a "waypoint" or a trajectory element called a "leg".

Moreover, as is known per se, each interior element is associated with interior descriptive data which have constraints such as a speed constraint, an altitude constraint, a desired time of passage, etc.

Such interior descriptive data therefore correspond to each element of the flight plan and represent data which vary depending on the nature of that element.

Advantageously according to the invention, at least some of the interior elements of a flight plan are further associated with one or more external elements, i.e. elements which are not comprised in the flight plan.

Such external elements are e. g. defined or determined or calculated from the interior elements of the flight plan.

Thus e. g. each external element associated with an interior element of a flight plan is chosen from the group comprising:

a procedure which can be used when flying over the corresponding interior element;

a geometric element (curvature, extent, shape, etc.) of the geometry of the trajectory when flying over the corresponding interior element;

external descriptive data (such as e. g. constraints) other than interior descriptive data associated with the corresponding interior element.

Thereafter, unless explicitly stated, the term "element" shall be used interchangeably to designate an interior element of a flight plan or an external element associated with an interior element of such a plan.

Similarly, unless otherwise specified, the term "descriptive data" will be used interchangeably to refer to interior descriptive data of a flight plan or to external descriptive data of such a plan.

The electronic generating device 10 according to the invention, is illustrated in more detail in FIG. 1.

Thus, as can be seen in FIG. 1, the electronic generating device 10 comprises a data receiver/transmitter 12 and a processing unit 14.

The data receiver/transmitter 12 is used for receiving data from external systems to be processed by the processing unit 14 and for transmitting processed data to said external systems or to other external systems.

In the example shown in FIG. 1, such external systems comprise e.g. a tablet 21, an FMS type flight management system 22, and a display interface 23.

Tablet 21 is e. g. a so-called open-world tablet of the aircraft, since the data transmitted from said tablet are not protected according to the same aeronautical standards as the checking aid module 10.

For example, the link between the receiver/transmitter 12 and this tablet 21 is a protected link to the avionics world, providing protection to filter data from the tablet 21 into the avionics world.

In particular, the tablet 21 is configured for sending to the data receiver/transmitter 12, a flight plan proposed to the pilot, e.g. during the flight of the aircraft.

The FMS type system 22 and display interface 23 are part of the avionics world insofar as the data exchanged with said systems have avionics data which are protected according to the same aeronautical standards as the checking aid module 10 or according to standards providing a higher security level.

In particular, the FMS type system 22 is apt to supply a flight plan to the data receiver/transmitter 12, e.g. the current flight plan of the aircraft or any other flight plan, e.g. a flight plan being prepared by the pilot.

The display interface 23 has a communication interface between the pilot and the electronic generating device 10.

The interface 23 has e. g. a touch screen which allows the pilot to enter data intended for the data receiver/transmitter 12 through a touch movement on said screen and to display data coming from said data receiver transmitter 12.

In a variant or in addition, the interface 23 is a voice-user interface which can record at least one voice message from the pilot towards the voice-user interface.

The processing unit 14 is used to process input data from the receiver/transmitter 12 in order to produce output data.

In particular, the input data from the data receiver/transmitter 12 comprise at least two flight plans, one of said flight plans in the following will be called first flight plan P1 and the other will be called second flight plan P2.

The first flight plan P1 comes e. g. from the FMS system 22 and corresponds to the current flight plan of the aircraft.

The second P2 flight plan comes from tablet 21 and represents a flight plan proposed by a third party such as the airline company or any other ground service.

In a variant, the second P2 flight plan comes from a "Datalink" type on-board system which is thus also connected to the data receiver/transmitter 12, or comes from the FMS type system 22.

The input data further comprise external elements and external descriptive data associated with each flight plan, as well as overall predictions, initialization and performance data, and weather data associated with each flight plan.

In particular, the processing unit 14 includes a display module 24, an acquisition module 26, a copying module 28, a processing module 30, and advantageously a communication module 32.

Figure 2:
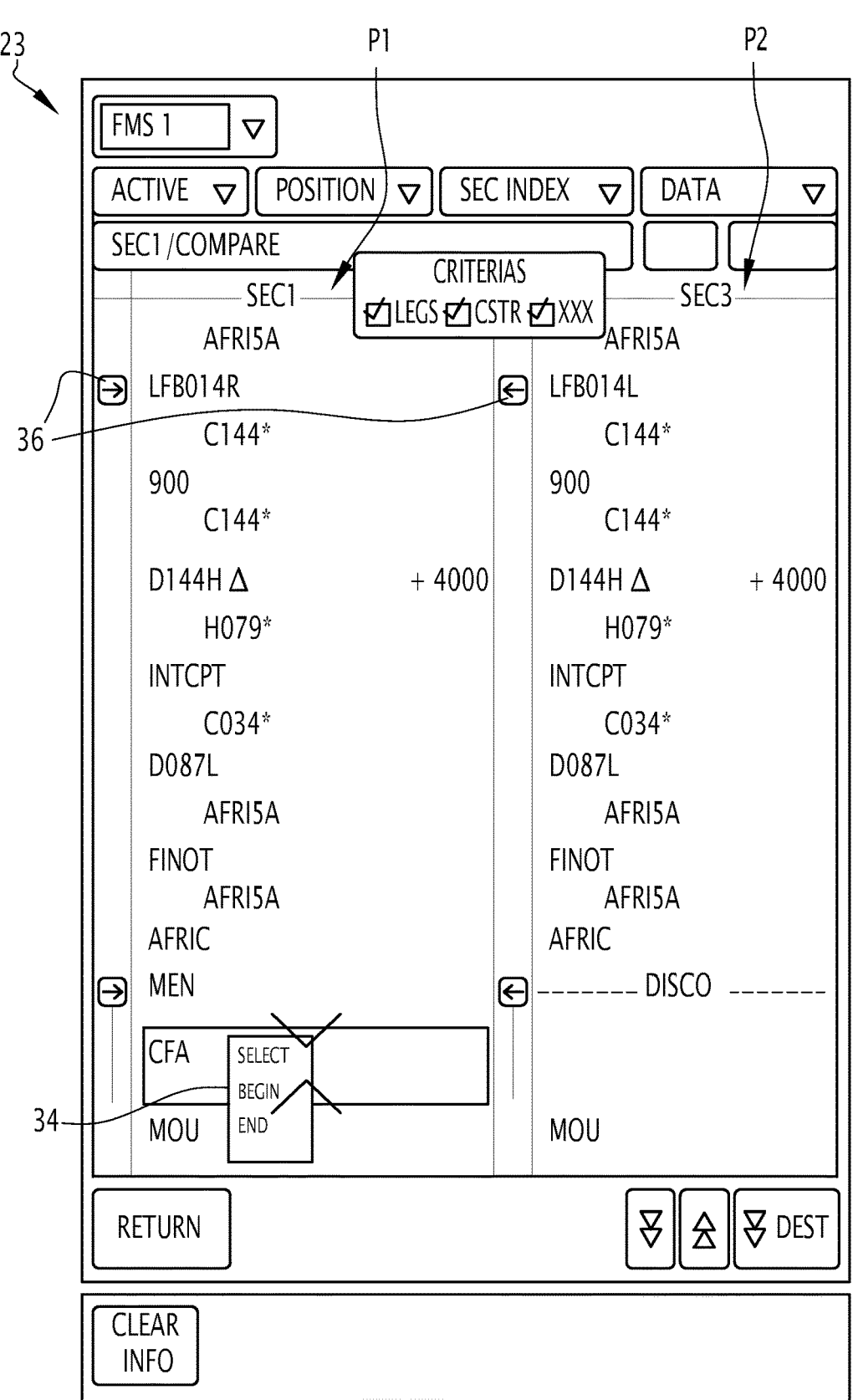
FIGS. 2 and 3 show a display interface connected to the electronic generating device in FIG. 1.

As shown in FIG. 2, the display module 24 is configured for displaying both P1, P2 flight plans simultaneously on the interface 23.

The display 24 is configured for viewing, for each P1, P2 flight plan, the common elements and the distinct elements with regard to the other P1, P2 flight plan.

E.g., as shown in FIG. 2, the common elements between the two flight plans P1, P2 are displayed opposite each other.

Advantageously, the display module 26 is apt to display the common elements and the distinct elements, differently.

E.g. The common elements are displayed with the same color and distinct elements with a different color.

Figure 3:
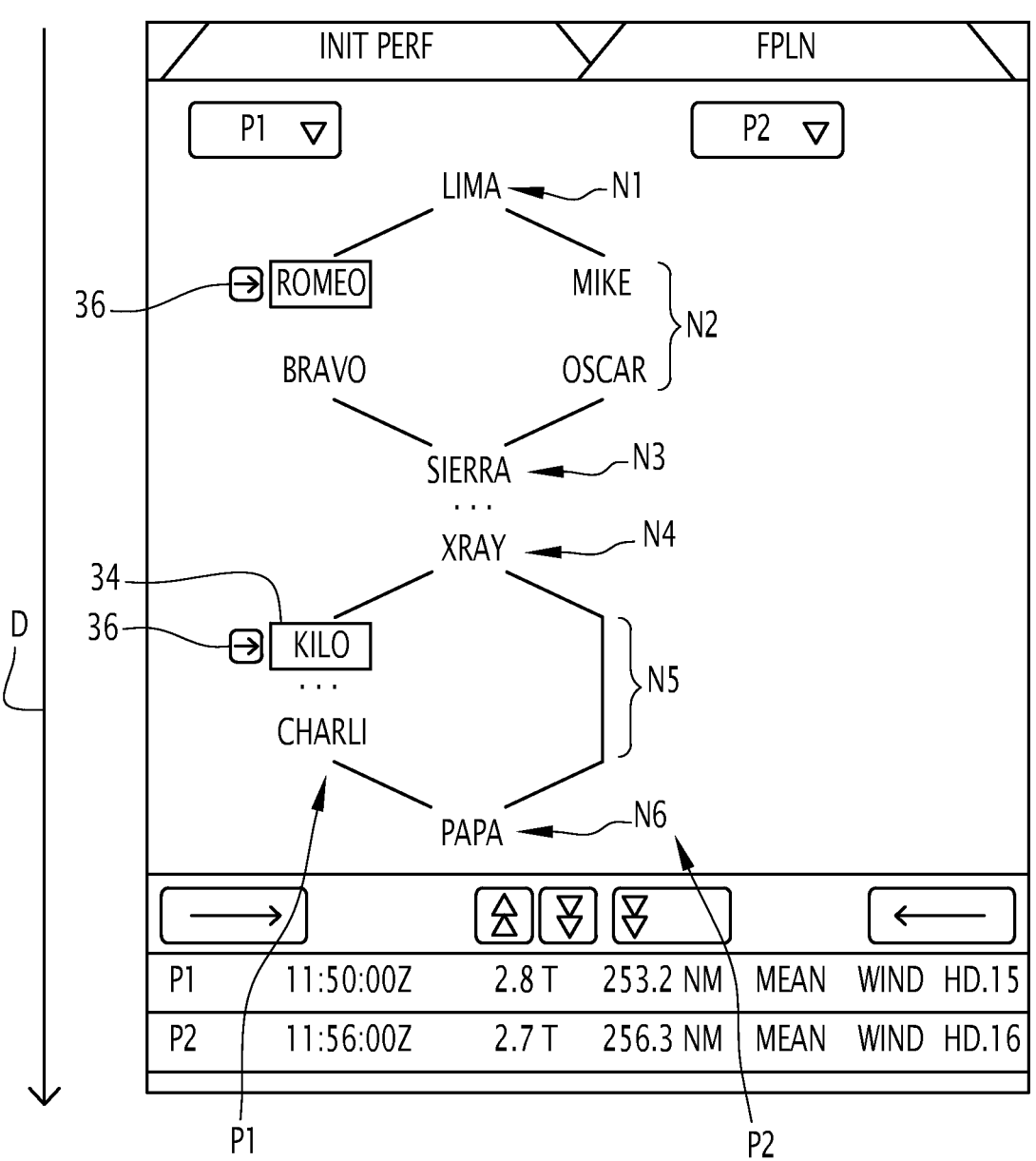

In addition or in a variant, as shown in FIG. 3, the display module 24 is configured for displaying flight plans in a tree structure defining a plurality of N1, . . . , N6 levels.

The tree structure defines a plurality of levels, each level comprising one root formed by one of the common elements or a branch for each flight plan. At least one of the branches amongst the branches of a same level comprises at least one of the distinctive elements associated with the corresponding flight plan.

In other words, each level comprises either a single element which is then a common element of the flight plans or one or more distinctive elements for at least one flight plan. The distinctive elements of a flight plan then form a branch.

The acquisition module 26 is configured for acquiring at least one copy command from a user, in particular the pilot, from the display interface 23.

In particular, the acquisition module 26 is configured so as to associate a touch movement of the pilot on the touch screen with an associated command.

As an example, as shown in FIG. 2, the display module 26 is apt to display a selection range 34 for selecting one or more elements.

In addition or in a variant, the acquisition module 26 is configured for associating a voice message from a user, in particular the pilot, directed to the voice-user interface, with an associated command.

As is known per se, the flight plan is broken down into a plurality of predetermined flight phases. Each flight phase comprises at least one of the elements associated with said flight plan.

The flight phases correspond e. g. to the take-off phase, to a climb phase, to a cruising phase, to the landing phase, etc.

The acquisition module 26 is then configured so as to acquire a command associated with at least one of said phases, i.e. all of the elements comprised in the flight phase.

The pilot selects e. g. the full take-off phase on the touch screen, or the pilot gives a voice command to select the landing phase of the aircraft.

In a way that is also known per se, the flight plan is broken down into a plurality of predetermined control zones. Each control zone comprises at least one of the elements associated with the flight plan.

Each control zone is associated with a flight control center external to the aircraft. The control center is e. g. a control tower wherein an air controller is in communication with the pilot so as to authorize the flight plan in the associated control zone.

The acquisition module 26 is then configured for acquiring a command associated with at least one of the control zones, i.e. all the elements comprised said control zone.

E. g., the pilot selects on the touch screen, the next control zone that the aircraft will fly through.

The acquisition module 26 is further configured so as to receive a cancellation command from the pilot or from one of the external control centers.

For this purpose, the display module 26 is apt to display a button in the form of a cross next to the copied elements.

The copying module 28 is configured for copying at least one of the distinct elements from one of the two flight plans, P1, P2 called source flight plan to the other P1, P2 flight plan called target flight plan depending on the copy command.

In particular, the copying module 28 is configured for copying one or more elements selected by the pilot from the source flight plan to the target flight plan.

Copying an element means that said element from the source flight plan is inserted into the ordered list of elements forming the target flight plan.

For this purpose, as shown in FIG. 2, the display module 26 is e. g. apt to display a button 36 in the shape of an arrow pointing to the target flight plan on the side of each selected set of elements.

Advantageously, the copying module 28 is configured for copying at least one of the phases comprising at least one of the distinct elements of said flight plan.

As an example, the pilot selects a flight phase on the touch screen and presses the arrow button so as to command the copying of said phase to the target flight plan.

As a variant or in addition, the copying module 28 is configured for copying at least one of the control zones comprising at least one of the distinct elements of said flight plan.

As an example, the pilot vocally selects the next control zone to fly over and commands the copying thereof to the target flight plan.

The copying module 28 is further configured for canceling the copying, either permanently or temporarily, depending on the cancellation command received.

E. g. when one of the control centers refuses the modification brought to the new flight plan, the pilot cancels the copying of the elements associated with the control zone of said control center.

The processing module 30 is configured for generating a new flight plan from the target flight plan and from the distinct element or elements which were copied.

In particular, the processing module 30 is configured for recalculating the physical passage points ("waypoint") of the aircraft and the trajectory elements ("leg") associated with the new flight plan.

The communication module 32 is configured for sending the new flight plan to a control center external to the aircraft.

E.g. the communication module 32 sends the new flight plan to the control center of the next control zone the aircraft flies through, in order to obtain permission to fly through said control zone.

To this end, the display module 24, the acquisition module 26, the copying module 28, the processing module 30, and the communication module 32 are e. g. at least partly in the form of a software program or a programmable logic circuit such as an FPGA (Field-Programmable Gate Array).

To implement the operation of the modules 24, 26, 28, 30, 32, the electronic generating device 10 is e. g. integrated into an existing on-board computer of the aircraft or a computer remote from the aircraft, e.g. a ground computer.

According to a particular embodiment of the invention, the electronic generating device 10 has a software and/or hardware component of the system of the FPGA type 22.

Figure 4:
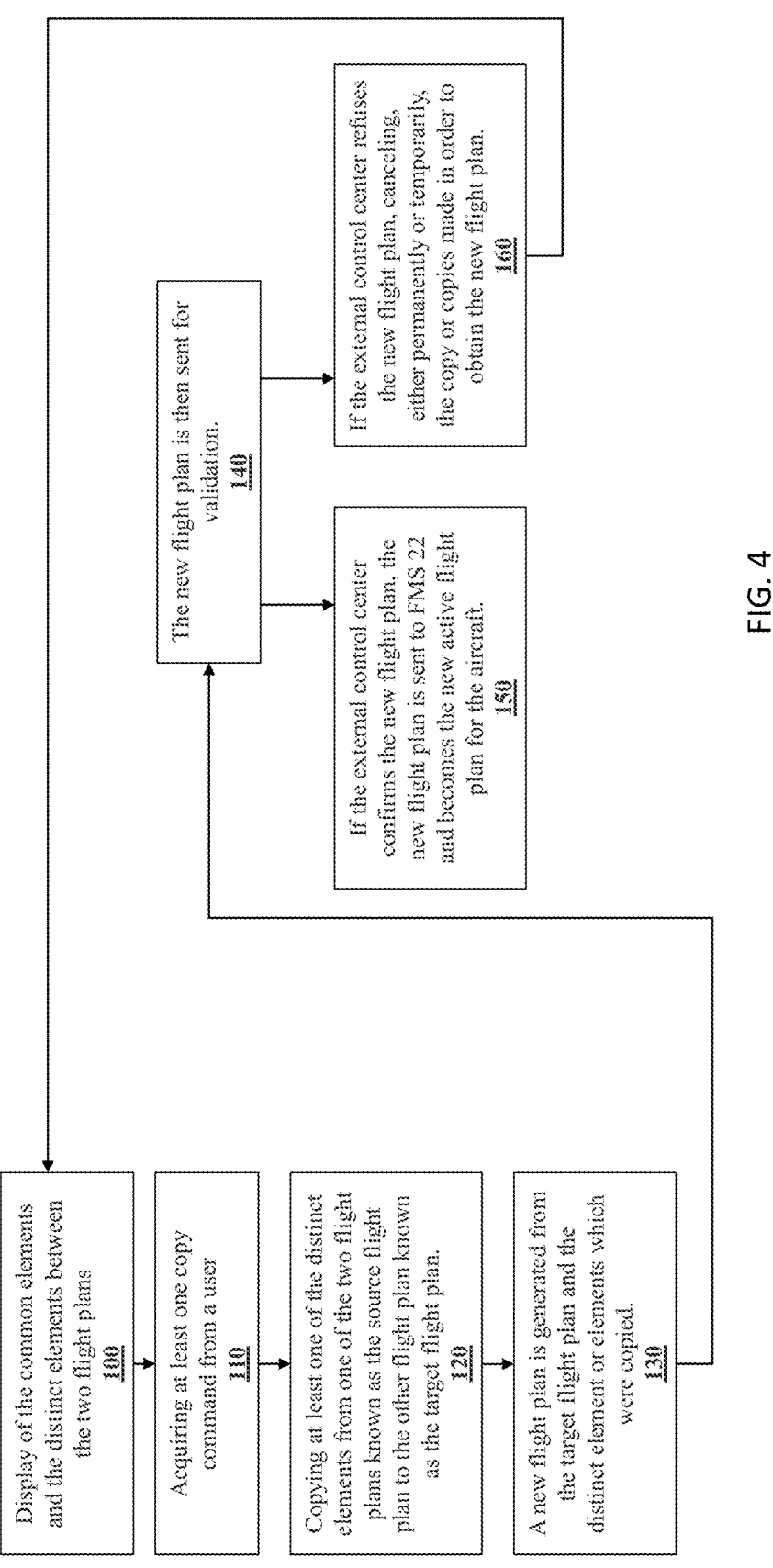
FIG. 4 is an organizational chart of a method for generating a flight plan according to the invention.

A method for generating a flight plan for an aircraft implemented by the electronic generating device 10 will now be described with reference to FIG. 4, which presents a flowchart of the steps thereof.

It is initially considered that the data receiver/transmitter 12 receives two separate flight plans.

Among said flight plans, as explained above, a first flight plan P1 comes from e. g. the FMS system 22 and corresponds to the current flight plan of the aircraft, and a second P2 flight plan comes e. g. from the tablet 21 and corresponds to the flight plan submitted to the pilot for acceptance by the airline or by an external control center.

The method according to the present invention, comprises an initial step 100 of simultaneous display of the two flight plans, as can be seen in FIGS. 2 and 3.

During the step 100, the method further comprising the display of the common elements and the distinct elements between the two flight plans.

Advantageously, the two flight plans are represented in a tree structure form as described above.

In order to show the display, the processing module 30 first compares the two flight plans, element-by-element, in order to identify common elements and distinct elements of said flight plans.

The method then comprises a step 110 for acquiring at least one copy command from a user, in particular the pilot.

The command is acquired via the display interface 23, in particular a touch screen or a voice-user interface.

E.g. On the touch screen, the pilot selects one element, a flight phase or control zone, via the selection range 34.

The method then comprises a step 120 of copying at least one of the distinct elements from one of the two flight plans known as the source flight plan to the other flight plan known as the target flight plan, according to the copy command.

In particular, the element, the flight phase or the control zone selected by the pilot is copied to the other flight plan using the button 36.

During a step 130 then, a new flight plan is generated from the target flight plan and the distinct element or elements which were copied.

In particular, the physical points of passage of the aircraft and the trajectory elements associated with the new flight plan are recalculated.

The new flight plan is then sent for validation, during a step 140, to an external control center.

If the external control center confirms the new flight plan, the new flight plan is sent to FMS 22 and becomes the new active flight plan for the aircraft during a step 150.

If the external control center refuses the new flight plan, the process comprises a step 160 of canceling, either permanently or temporarily, the copy or copies made in order to obtain the new flight plan.

The method then includes a new iteration of the steps 100 to 140, until one of the new flight plans generated is accepted by the external control center.

It is then easy to understand that the present invention has a number of advantages.

First of all, the present invention provides a synthetic view of the two flight plans, which are displayed side-by-side on the display interface 23.

Moreover, the electronic generating device 10 according to the invention, allows for a fast and easy copy to be made of elements from one flight plan to another.

In particular, the pilot can easily copy a flight phase or a complete control zone to the other flight plan.

The generation of the new flight plan and the sending thereof to an external control center, can then be used for a simplified negotiation. Indeed, in the event of refusal, the invention allows the copies made to be simply canceled and other elements to be copied in order to have a new flight plan accepted.

The invention thus reduces the cognitive workload of the pilot e. g. when it is necessary to check a flight plan from a third party.

The invention claimed is:

1. An assembly comprising a Flight Management System (FMS) and an electronic generating device of a flight plan for an aircraft, the FMS including a current flight plan on which the aircraft is configured to fly, the electronic generating device comprising:

a receiver/transceiver configured to transmit, to a processing unit:

the current flight plan included in the FMS, denoted first flight plan, and a second flight plan proposed by a third party, the processing unit comprising:

a display module configured for displaying the current flight plan included in the FMS, denoted a first flight plan, and a second flight plan simultaneously, each flight plan being associated with an ordered list of elements, the display module being further configured for displaying, for each flight plan, common elements and distinct elements between the first flight plan and the second flight plan, wherein the display module being configured to display the common elements and the distinct elements, differently;

an acquisition module configured for acquiring at least one copy command from a user;

a copying module configured for copying at least one of the distinct elements from one of the two flight plans called a source flight plan to another flight plan called a target flight plan, according to a copying order; wherein the copying of at least one of the distinct elements includes inserting an element from the source flight plan, wherein the copying an element being the element from the source flight plan is inserted into the ordered list of elements associated to the target flight plan;

a processing module configured for generating a new flight plan based on the target flight plan and a distinct element or elements which were copied; and a communication module configured for sending the new flight plan to a control center that is external to the aircraft;

wherein the electronic generating device being configured to send the new flight plan to the FMS if the control center confirms the new flight plan, the new flight plan becoming the current flight plan according to which the aircraft flies.

2. The assembly according to claim 1, wherein each flight plan is broken down into a plurality of predetermined flight phases, each flight phase comprising at least one of the elements associated with the flight plan, the copying module being configured for copying at least one of phases comprising at least one of the distinct elements of the flight plan.

3. The assembly according to claim 1, wherein each flight plan is broken down into a plurality of predetermined control zones, each control zone being associated with a flight control center external to the aircraft, each control zone comprising at least one of the elements associated with the flight plan, the copying module being configured for copying at least one of the plurality of predetermined control zones comprising at least one of the distinct elements of the flight plan.

4. The assembly according to claim 1, wherein the acquisition module is further configured for receiving a cancellation command, the copying module being configured for canceling a copy, either permanently or temporarily, depending on the cancellation command.

5. The assembly according to claim 1, further comprising a touch screen, the acquisition module being configured for associating a movement of the user on the touch screen with an associated command.

6. The assembly according to claim 1, which further comprises a voice-user interface, the acquisition module being configured for associating a voice message from the user towards the voice-user interface, with an associated command.

7. The assembly according to claim 1, wherein the display module is apt to display differently the common elements and the distinct elements.

8. The assembly according to claim 1, wherein the display module is configured for displaying flight plans in a tree structure defining a plurality of levels, each level comprising a unique root formed by either the common elements or a branch for each flight plan, at least one branch among a plurality of branches of a same level comprising at least one of distinctive elements associated with a corresponding flight plan.

9. A method for generating a flight plan for an aircraft flying according to a current flight plan included in a Flight Management System (FMS), the method comprising at least following steps:

simultaneous displaying the current flight plan included in the FMS, denoted a first flight plan, and a second flight plan, each flight plan being associated with an ordered list of elements;

displaying common elements and distinct elements between the first flight plan and the second flight plan, wherein the common elements and the distinct elements are displayed differently;

acquiring at least one copy command from a user;

copying at least one of the distinct elements from one of the two flight plans called a source flight plan to another flight plan called a target flight plan according to the copy command; wherein the copying of at least one of the distinct elements includes inserting an element from the source flight plan, and the copying an element being the element from the source flight plan is inserted into the ordered list of elements associated to the target flight plan;

generating a new flight plan from the target flight plan and the element or the distinct elements which were copied;

sending the new flight plan to an external control center, for validation; and when the external control center confirms the new flight plan, sending the new flight plan to the FMS, the new flight plan becoming the current flight plan according to which the aircraft flies.

10. A computer program product comprising software instructions which, when executed by a computer, implement the method according to claim 9.

* * * * *